United States Patent [19]

Aoyama

[11] Patent Number: 5,033,836
[45] Date of Patent: Jul. 23, 1991

[54] SPECTACLES WITH HINGED TEMPLE ORNAMENTS

[75] Inventor: Kiyohiko Aoyama, Sabae, Japan

[73] Assignee: Aoyama Gankyo Kabushiki Kaisha, Fukui, Japan

[21] Appl. No.: 487,108

[22] Filed: Mar. 2, 1990

[30] Foreign Application Priority Data

Apr. 17, 1989 [JP] Japan .................................. 1-45413

[51] Int. Cl.⁵ .............................................. G02C 11/02
[52] U.S. Cl. ........................................ 351/51; 351/52; 351/158; 351/153
[58] Field of Search ..................... 351/51, 52, 153, 158

[56] References Cited

U.S. PATENT DOCUMENTS 2,627,782  2/1953  May ........................................ 351/51
4,806,008  2/1989  Tarloff .................................. 351/52

Primary Examiner—Paul M. Dzierzynski
Attorney, Agent, or Firm—Staas & Halsey

[57] ABSTRACT

Ornamental materials are located on hinged portions of spectacles to provide, at the temple pieces, an original, variable and beautiful design.

4 Claims, 5 Drawing Sheets

SPECTACLES WITH HINGED TEMPLE ORNAMENTS

BACKGROUND OF THE INVENTION

This invention relates to an improvement for temple ornamental mechanisms of spectacles or eyeglasses and, more particularly, to spectacles which have replaceable and freely movable temple ornaments using a hinge, which provide the spectacles with quite original designs.

As well known, spectacles are worn in front of the human eyes. When spectacled, there is a big change in one's facial appearance and image. Spectacles now have been regarded as a kind of fashionable accessory, in addition to the practical purpose of eyesight correction.

People have come to want more and more spectacles equipped with a special personality, i.e., with high fashion and with some desirable decorations. As a result, jewels or the like have been set in the front of the frame or at a temple position of the spectacles.

The conventional ornaments or decorations are incorporated in a fixed and static condition. To date the ornaments have not been manufactured as dynamic and powerful designs and the ornaments were not simply and freely replaced in a practical manner.

SUMMARY OF THE INVENTION

The present invention has an object to provide spectacles with hinged temple ornaments, wherein a freely movable member is established in the temple portion of the spectacles and is available for forming dynamic designs, and the ornaments are replaceable in a simple manner, when desired.

The present invention has another object to provide spectacles with hinged temple ornaments, wherein an original design expression can be realized by adopting a new ornamental mechanism at the hinge member of normal spectacles.

This invention has a further object to provide spectacles with hinged temple ornaments, wherein variable decorations with cubic effects are available and the assembly costs are less but with sturdy construction.

In order to achieve the aforesaid objects, the present invention provides means for receiving ornamental members, which is added to hinge members belonging to both sides of the front frame of the spectacles. That is, an operable lever is pivoted on the hinge members fixed on the front frame side or the temple side, and on an outer surface of the lever the ornamental portions are formed, whereby the ornamental portions can be observed from the outside.

DETAILED DESCRIPTION OF THE PREFERRED EMBODIMENTS

Figure 1:
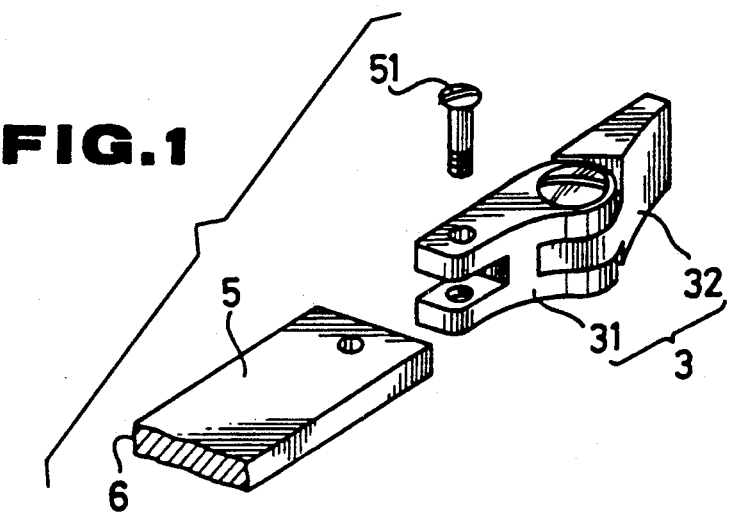
FIG. 1 is a broken and perspective view illustrating a first embodiment of the present invention.

The numeral (1) shows a front frame of spectacles, the numeral (2) indicates a bracket, the number (3) shows a hinge and the numeral (4) indicates a temple piece. These four members are conventional.

The present invention is directed to an operable lever (5) pivoted by a shaft (51) on either member (31) or member (32) of the hinge (3), and ornamental portions (6) formed on the outside of the lever (5), the ornamental portions (6) being clearly observed from the outside of the spectacles.

Figure 2:
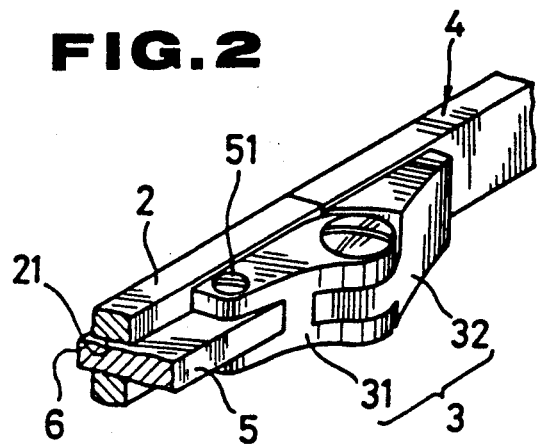
FIG. 2 is a perspective view of the invention seen from the inner side.
Figure 3:
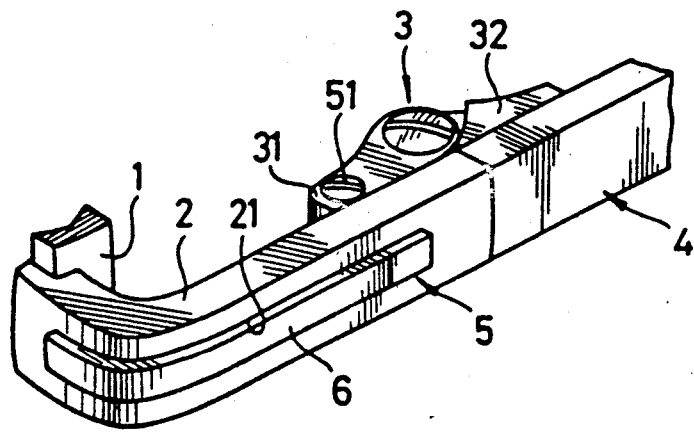
FIG. 3 is a perspective view of the invention seen from the outer side.

In the first embodiment shown in FIG. 1 through FIG. 3, the operable lever (5) is formed as a curved plate corresponding to the bracket (2), which is formed in a J-like shape, and the width of the lever (5) is greater than that of the bracket (2). The operable lever (5) is pivoted by the shaft (51) on the hinge member (31), and the lever (5) can turn toward the bracket (2) on the basis of the shaft (51). The numeral (21) shown in FIG. 2 and FIG. 3 is an opening or window for an ornamental portion (6) formed on the outer side of the operable lever (5). When the lever (5) is turned and inserted into the window (21), the ornamental portions (6) are exposed in convexoplane style through the window (21), whereon, as shown in FIG. 3, the decorative subject comes up in cubic effect on the outside of the bracket (2).

Figure 4:
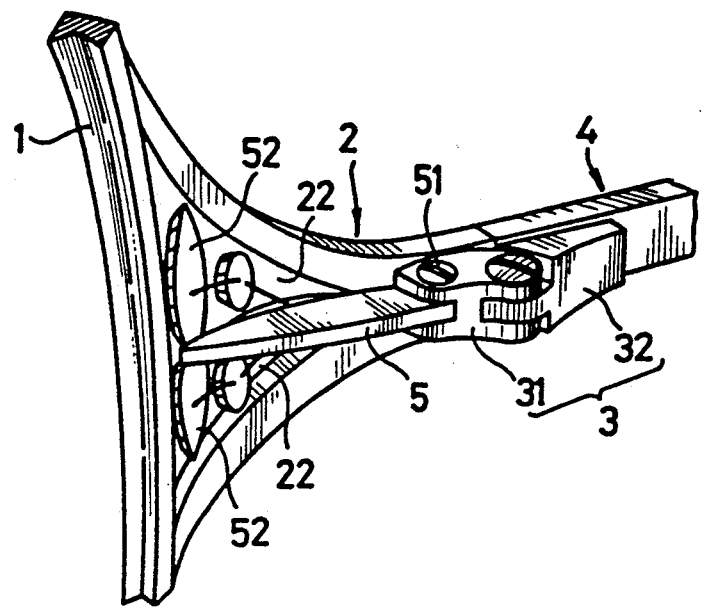
FIG. 4 is a perspective view of a second embodiment of the invention seen from the inner side.
Figure 5:
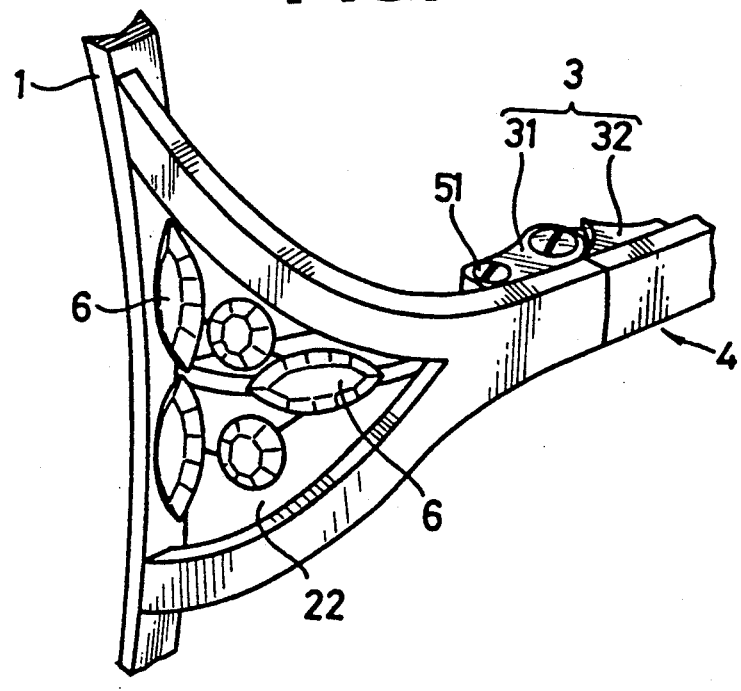
FIG. 5 is a perspective view of the invention seen from the outer side.

For the second embodiment shown in FIG. 4 and FIG. 5, the bracket (2) forks off into bifurcated portions (22) toward a front frame (1), and the bifurcated portions (22) are transparent, wherefrom ornamental portions (6) formed on the outside of the operable lever (5) can be seen. The operable lever (5) has a free end which forms a holder (52) for various ornaments over almost the same space as defined by the bifurcated portions (22). Various kinds of ornamental materials such as jewels, cloisonnes and so on can be held on the outside of the holder (52) which forms the ornamental portions (6). This operable lever (5) is pivoted by the shaft (51) in the same manner as the first embodiment, and the lever (5) can turn toward the bracket (2) on the basis of the shaft (51).

Figure 6:
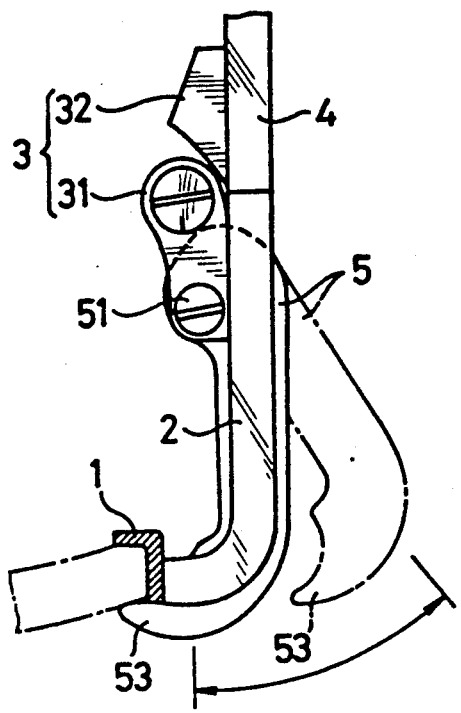
FIG. 6 is a partly horizontal sectional view of a third embodiment of the invention.
Figure 7:
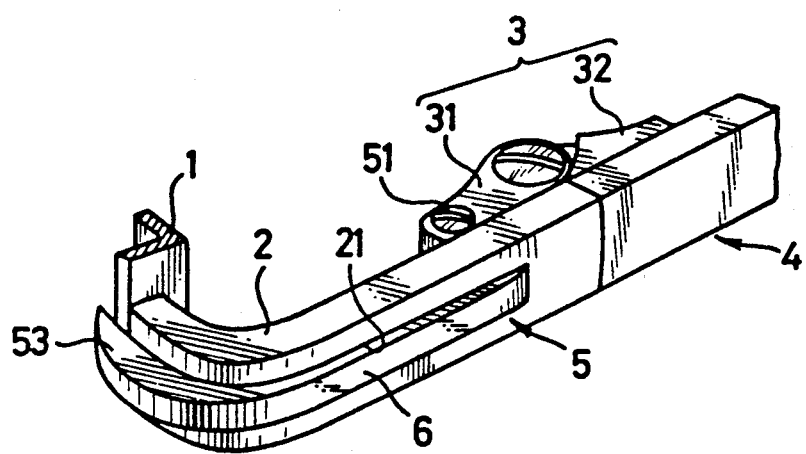
FIG. 7 is a perspective view of the invention seen from the outer side.

For the third embodiment shown in FIG. 6 and FIG. 7, a front frame (1) is constructed according to the known lens rim method, "i.e., the frame is" L-shaped in cross-section, and thus the lens is freely set on or off. The lens is available to be set out by pushing the same forward. The operable lever (5) is pivoted on the one piece hinge member (31) by the shaft (51) in a manner similar to that of the first embodiment, and it can turn freely to the outside from a window (21). On the other hand, a free end of this operable lever (5) extends in a crooked fashion slightly over the front frame (1) whereupon a hook (53) is formed in order to lock the lens.

Figure 8:
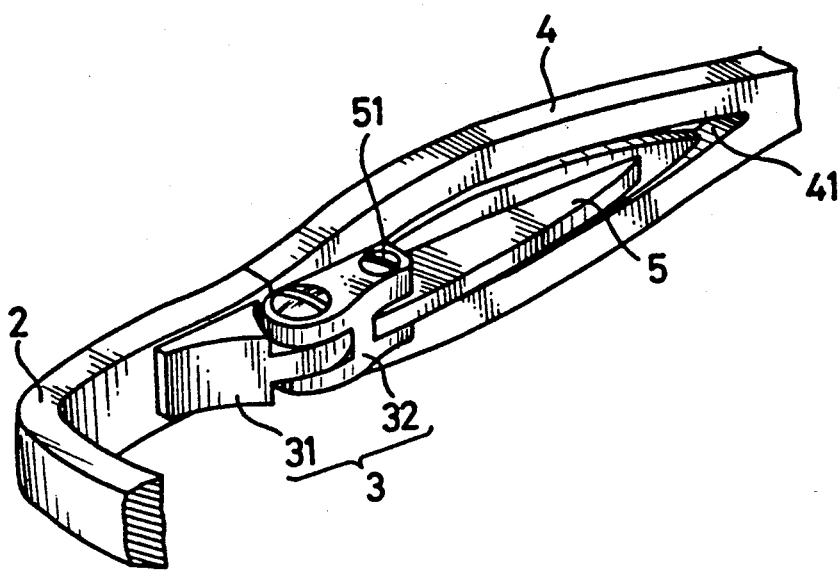
FIG. 8 is a perspective view of a fourth embodiment of the invention seen from the inner side.
Figure 9:
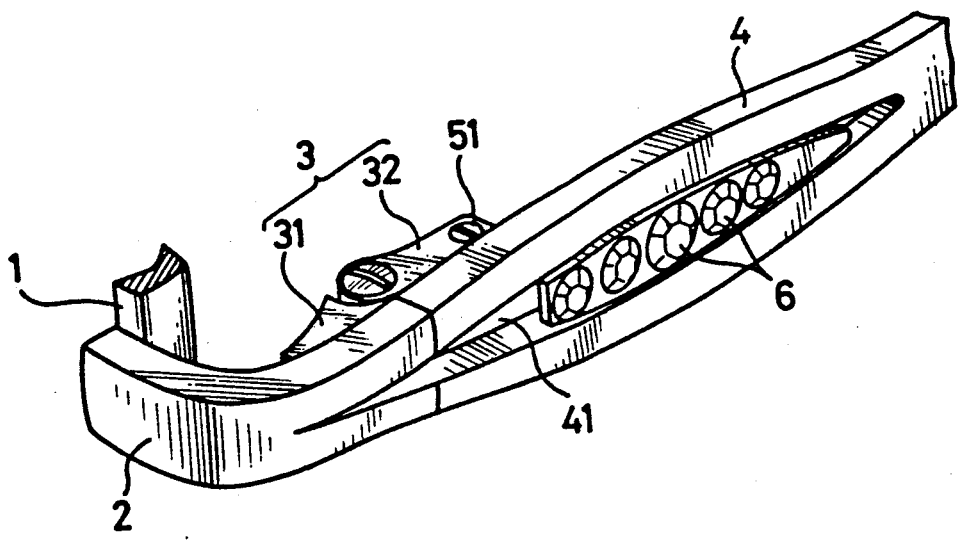
FIG. 9 is a perspective view of the invention seen from the outer side.

For the fourth embodiment shown in FIG. 8 and FIG. 9, the operable lever (5) is pivoted on the hinge member (32) by the shaft (51), and a free and thereof can turn freely toward the temple piece (4). A window (41) is established on the turning portions of the operable lever (5), wherefrom ornamental portions (6) are exposed outside for eye catching. On the ornamental portions (6), ornamental materials such as jewels, cloisonnes and so on are inserted and fixed accordingly.

Figure 10:
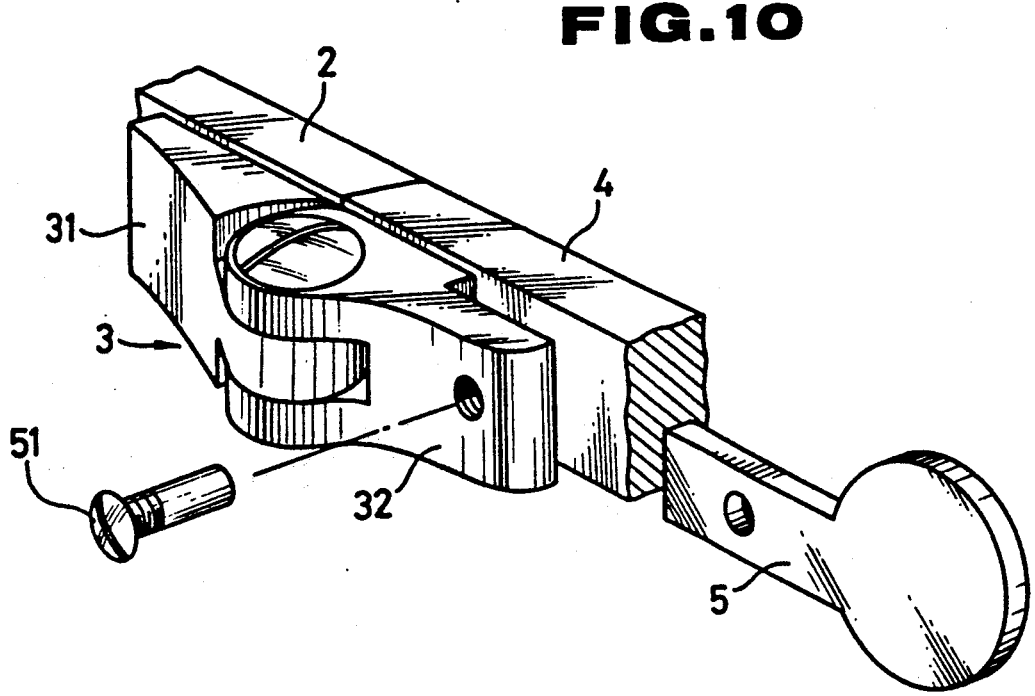
FIG. 10 is a perspective view of a fifth embodiment of the invention seen from the inner side.
Figure 11:
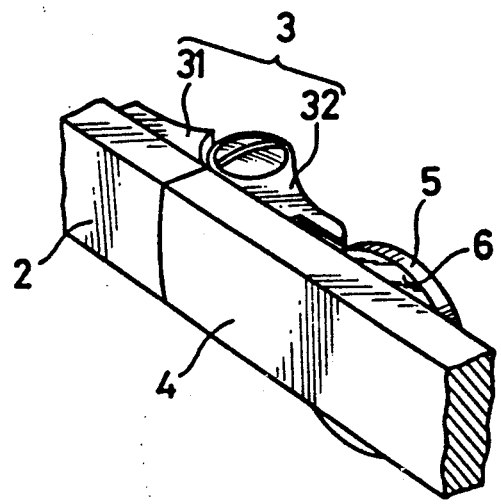
FIG. 11 is a perspective view of the invention seen from the outer side.

For the fifth embodiment shown in FIG. 10 and FIG. 11, the operable lever (5) has a free end in the form of a flat scoop, and the lever (5) is pivoted between the member (32) of the hinge (3) and the temple piece (4), and it can turn freely up and down. On the outer surface of the free end gold plating is furnished, which becomes the ornamental portions (6) for appearance. When this free end with gold plating is in parallel to the temple piece (4), a beautiful design is obtained.

While certain present preferred embodiments of the invention have been shown and described, it is to be understood that various modifications may be made therein in light of the above techniques. It is therefore to be understood specially that the construction or constitution for the ornamental portions (6) prepared on the outside of the operable lever (5) can be changed without departing from the spirit and scope of this invention.

The foregoing explains spectacles with hinged temple ornaments, adapted to pivot an operable lever on one or the other hinge member, said operable lever being furnished with visible ornamental portions on its outside, which produces a really dynamic decorative design as never seen before. Moreover, if necessary, the operable lever can be replaced simply on demand, which allows one to enjoy variable designs.

As explained so far, this invention can exceed greatly the limit of ornamental spectacles which have been developed by the prior art, and further, the invention attains the practical and economical realization of the new designs without incurring any substantial cost and with a simple mechanism.

What is claimed is:

1. Spectacles with hinged temple ornaments, comprising:
   (a) a spectacle front frame including lateral brackets;
   (b) a pair of temple pieces, each temple piece being foldable relative to each bracket of the front frame via a hinge including hinge means;
   (c) an operable lever, one end of which is pivoted on one hinge member on the side of the front frame, so that a free, opposite end of the operable lever is movable relative to the front frame;
   (d) ornamental portions formed on an outside surface of the operable lever; and
   (e) a window formed in each temple piece corresponding to an area in which the operable lever moves, wherein the operable lever is available for viewing in the window.

2. Spectacles with hinged temple ornaments, comprising:
   a) a pair of brackets connected to ends of a spectacle front frame;
   b) a pair of temple pieces, each temple piece being movable relative to each bracket via a hinge inside the spectacles including first and second hinge members,
   wherein the first hinge member is connected to the bracket and the second hinge member is connected to the temple piece;
   c) a window formed in at least one bracket;
   d) an operable lever pivotably mounted to at least one first hinge member, whereby at least a portion of the operable lever is received in said window and exposed outside the spectacles; and
   e) ornamental portions formed on the exposed portion of the operable lever.

3. Spectacles according to claim 2, wherein the window is formed by a bifurcated end connected to the spectacle front frame and the ornamental portions on the operable lever are exposed in the bifurcated end.

4. Spectacles with hinged temple ornaments, comprising:
   a) a pair of brackets connected to a spectacle front frame;
   b) a pair of temple pieces, each temple piece being movable relative to each bracket via a hinge inside the spectacles including first and second hinge members,
   wherein the first hinge member is connected to the bracket and the second hinge member is connected to the temple piece;
   c) a window formed in at least one temple piece;
   d) an operable lever pivotably mounted to at least one second hinge member whereby at least a portion of the operable lever is received in said window and exposed outside the spectacles; and
   e) ornamental portions formed on the exposed portion of the operable lever.

* * * * *